United States Patent
Tsurutani et al.

(10) Patent No.: US 6,610,437 B2
(45) Date of Patent: Aug. 26, 2003

(54) CLOSURE ASSEMBLY FOR SEALED BATTERIES

(75) Inventors: Shinji Tsurutani, Hirakata (JP); Seiichi Mizutani, Hirakata (JP); Hideaki Yoshio, Moriguchi (JP); Kenjin Masumoto, Nishinomiya (JP); Hideyuki Kobayashi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 46 days.

(21) Appl. No.: 09/907,928

(22) Filed: Jul. 12, 2001

(65) Prior Publication Data

US 2001/0041284 A1 Nov. 15, 2001

Related U.S. Application Data

(62) Division of application No. 09/367,576, filed on Aug. 17, 1999, now Pat. No. 6,284,403.

(30) Foreign Application Priority Data

Dec. 18, 1997 (JP) ................................................. 9-348952

(51) Int. Cl.[7] ................................................. H01M 2/12
(52) U.S. Cl. ............................... 429/56; 429/53; 429/57; 429/58; 429/66; 429/82; 429/116; 429/163; 429/171
(58) Field of Search ............................... 429/53, 56, 57, 429/58, 66, 82, 116, 163, 171

(56) References Cited

U.S. PATENT DOCUMENTS 5,741,606 A * 4/1998 Mayer et al. .................. 429/53

* cited by examiner

*Primary Examiner*—Patrick Ryan
*Assistant Examiner*—Angela J Martin
(74) *Attorney, Agent, or Firm*—Jordan and Hamburg LLP

(57) ABSTRACT

A closure assembly for sealed batteries in which explosion-proof features are incorporated. A metal plate having a hole, an insulating resin sheet, a metal thin sheet, an insulating sheet having an air hole, a metal guide plate having a hole, and a metal cap are laid upon one another within an insulating gasket. Metal plate and metal guide plate are in contact with each other and electrically connected. Upon a build-up of pressure within the battery, the insulating resin sheet expands and ruptures, whereby a narrow part provided in the metal thin sheet positioned above the insulating resin sheet breaks, thus cutting supply of electric current.

18 Claims, 8 Drawing Sheets

Fig. 7
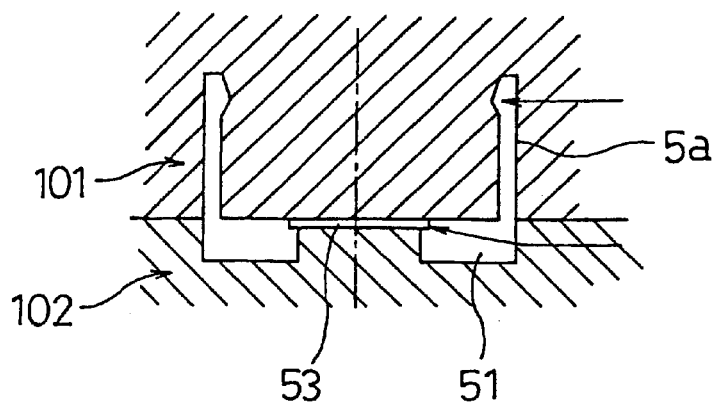
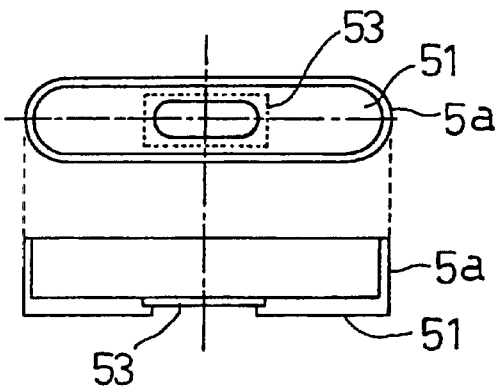
Fig. 8A
Fig. 8B
Fig. 9A
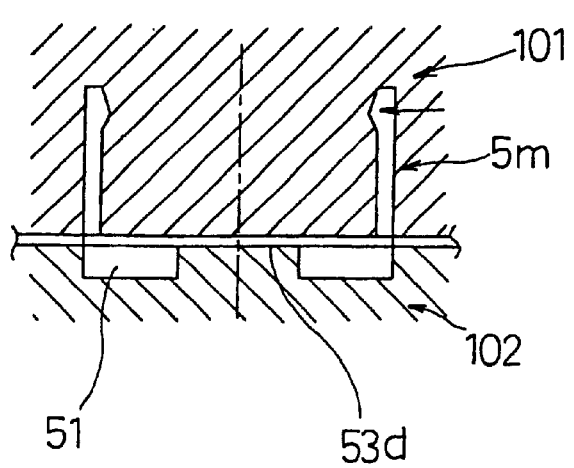
Fig. 9B
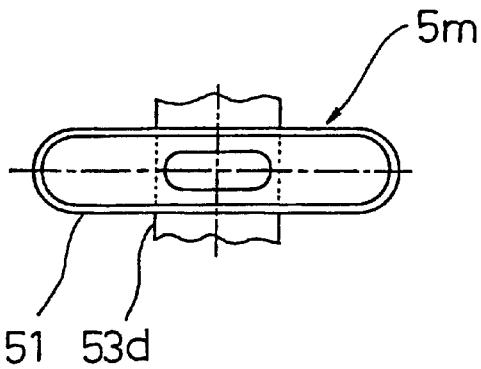

CLOSURE ASSEMBLY FOR SEALED BATTERIES

REFERENCE TO THE RELATED APPLICATION

This is a division of application Ser. No. 09/367,576, filed Aug. 17, 1999 now U.S. Pat. No. 6,284,403 B1.

FIELD OF THE INVENTION

The present invention generally relates to the field of sealed batteries and more particularly to explosion-proof, safety features of a closure assembly incorporated in hermetically sealed secondary batteries such as lithium ion secondary batteries.

BACKGROUND OF THE INVENTION

There has been a rapid increase in portable, cordless electric appliances of audiovisual equipment, office equipment such as personal computers, and communications equipment in recent years. Since non-aqueous electrolyte secondary batteries typically represented by high-capacity alkaline rechargeable batteries or lithium ion secondary batteries are ideally suited as a drive power source for such equipment, research is being conducted to develop a sealed non-aqueous electrolyte secondary battery of high energy density and excellent load characteristics.

One example of prior art closure assemblies for sealed batteries is shown in FIG. 19 to FIG. 21. In these figures, reference numeral 110, 120, 130 represent a metal cap, a metal spacer, and an upper metal foil, respectively. The center of the upper metal foil 130 is warped to form a dent 131, and a thin part 132 is formed by impressing on one side relative to this dent 131, as shown in FIG. 21. 140 is a dish-like insulating gasket having a bottom, and 150 is a belt-like lower metal foil. The lower metal foil 150 has a bulge 151 in its center, a slit 152 in the form of letter C surrounding the bulge 151, and punched holes 153 at both ends of the slit 152, as shown in FIG. 20. 160 is a metal case in the form of a cup which has a gas vent 161 in its center and is joined to a lead terminal that is connected to one electrode. The closure assembly for sealed batteries constructed as described above is mounted airtightly to an open end of an outer case of the battery. In the case of the closure assembly for sealed batteries described above, the upper and lower metal foils 130, 150 are electrically connected only through a welding point S in their respective centers, and the breaking strength of an uncut portion formed by the slit 152 in the lower metal foil determines the pressure at which this electrical connection is broken. Specifically, when the internal pressure of the battery which acts on the upper metal foil 130 through the punched holes 153 builds up to a predetermined value, the pressure concentrates on the warped portion 131 of the upper metal foil 130, pushing same upwards and thereby inverting the dent into a bulge as shown by a phantom line in FIG. 19. The welding point S of the lower metal foil 150 is thus pulled up, splitting apart the uncut portion of the slit 152 and thereby disconnecting the upper metal foil 130 and lower metal foil 150. The contact between the lower metal foil 150 connected to an electrode through the metal case 160 and the upper metal foil 130 connected to the metal cap 110 through the metal spacer 120 is broken whereby electric current supply is stopped. A further build-up of internal pressure leads to rupture of the thin part 132 in the upper metal foil 130, through which the gas within the battery is released to the outside.

In the event of failure, over-charging or inappropriate use of the charger and alike, pressure can build up within the battery to an excessive level due to an abnormal increase of gas generated by chemical reaction within the battery.

The battery can eventually explode or damage the equipment to which it is applied. To avert such possibility, explosion-proof features are normally provided in this and other types of batteries to release gas to the outside in case of build-up of pressure within the battery beyond some predetermined limit.

Furthermore, since there is a risk of ignition upon rapid heating of the battery in non-aqueous electrolyte secondary batteries, safety features are also provided by which power supply is stopped prior to emission of the gas in case the internal pressure of the battery exceeds a predetermined limit.

In the prior art closure assembly for sealed batteries described above, due to difficulty in controlling the machining precision of the thin part 132 in the upper metal foil 130, there exists variation in the thin part 132. As a result, the breaking pressure at the point of letting out the internal gas cannot be fixedly determined. The breaking pressure at the point when power supply is stopped is not constant either, because of the variation in dimensions of the warped portion 131 in the upper metal foil 130 and uncut portion of the slit 152 due to difficulty in controlling the machining precision. Improvement in the reliability of the explosion-proof, safety features is thus strongly desired. Furthermore, since the upper and lower metal foils 130, 150 are thin films, minute cracks that can cause leakage are inevitably formed in the welding point S where the upper and lower metal foils 130, 150 are laser-welded. Moreover, a considerable space in upward and downward directions is required in order to allow the warped portion 131 of the upper metal foil 130 to be inverted, by which the dimensions of the entire closure assembly cannot be further reduced.

An object of the present invention is to solve the aforementioned problems, i.e., to improve the reliability of safety features of sealed batteries for averting explosion. Another object of the invention is to make the closure assembly thinner while improving its leakage-proof performance.

SUMMARY OF THE INVENTION

In order to accomplish the above objects, the present invention according to a first feature thereof provides a closure assembly for sealed batteries characterized in that a pressure receiving sheet that consists of a resin sheet or a metal foil and is arranged in the closure assembly has a pressure receiving portion defined in one part of the pressure receiving sheet, and the periphery of said pressure receiving portion is restricted by other elements constituting the closure assembly that are positioned above and below the pressure receiving sheet, so that, upon an abnormal increase in pressure within the battery, the pressure receiving portion of the pressure receiving sheet expands and eventually ruptures for releasing gas within the battery to the outside.

With the above construction, it is easier to control the thickness and area of the pressure receiving portion of the pressure receiving sheet at a predetermined value than to control the thickness of the thin part in the upper metal foil at a predetermined value in the prior art example. There is thus less variation in the breaking pressure, and the reliability of the explosion-proof safety features for releasing gas upon an abnormal build-up of internal pressure can be improved.

The present invention according to a second feature thereof provides a closure assembly for sealed batteries characterized in that an insulating resin gasket in the closure assembly is shaped in a dish-like form having a bottom and is provided with a thin part in the bottom thereof, said thin part being defined to be a pressure receiving portion, and the periphery of said pressure receiving portion of the insulating resin gasket is restricted by other elements constituting the closure assembly that are positioned above the periphery of the pressure receiving portion, so that, upon an abnormal increase in pressure within the battery, the pressure receiving portion of the insulating resin gasket expands and eventually ruptures for releasing gas within the battery to the outside.

With the above construction, similarly to the first feature of the present invention, the reliability of the explosion-proof safety features for releasing gas upon an abnormal build-up of internal pressure can be improved, and, the construction can be simplified since the resin sheet in the first feature of the present invention is omitted.

The present invention according to a third feature thereof provides a closure assembly for sealed batteries characterized by having an insulating resin sheet and a thin metal sheet positioned above the insulating resin sheet and provided with a rupture portion, said insulating resin sheet and thin metal sheet being laid over one another within the closure assembly, wherein the insulating resin sheet has a pressure receiving portion defined in one part of the insulating resin sheet, and the insulating resin sheet and thin metal sheet stacked on the insulating resin sheet are restricted at a position surrounding the pressure receiving portion by other elements constituting the closure assembly that are positioned above and below the insulating resin sheet and thin metal sheet, said rupture portion of the thin metal sheet being positioned above said pressure receiving portion, and an external electrode terminal of the battery is electrically connected to an internal electrode of the battery through the rupture portion of the thin metal sheet, so that, upon an abnormal increase in pressure within the battery, the pressure receiving portion of the insulating resin sheet expands, whereby the rupture portion of the thin metal sheet ruptures for breaking the electrical connection between the external electrode terminal and internal electrode of the battery.

With the above construction, since there is no need to provide a space in the closure assembly for allowing a warped portion of the upper metal foil to be inverted which was required in the prior art example, the closure assembly and the sealed battery itself can be made thinner. Unlike the prior art example, the rupture portion of the thin metal sheet does not have a welding point, and therefore the present invention exhibits better performance of preventing leakage of electrolyte. Moreover, as compared to the prior art example in which the warped portion of the upper metal foil is inverted, the breaking pressure at which the rupture portion breaks can be set precisely with less variation. As a result, the reliability of the explosion-proof safety features for cutting electricity supply when internal pressure builds up excessively can be improved.

The present invention according to a fourth feature thereof provides a closure assembly for sealed batteries characterized by having an insulating resin gasket shaped in a dish-like form having a bottom and provided with a thin part in the bottom thereof, said thin part being defined to be a pressure receiving portion, and a thin metal sheet having a rupture portion stacked upon the upper surface of the bottom of the insulating resin gasket, wherein the thin metal sheet is restricted at a position surrounding the pressure receiving portion by the insulating resin gasket and other elements constituting the closure assembly that are positioned above the thin metal sheet, said rupture portion of the thin metal sheet being positioned above said pressure receiving portion, and an external electrode terminal of the battery is electrically connected to an internal electrode of the battery through the rupture portion of the thin metal sheet, so that, upon an abnormal increase in pressure within the battery, the pressure receiving portion of the insulating resin sheet expands, whereby the rupture portion of the thin metal sheet ruptures for breaking the electrical connection between the external electrode terminal and internal electrode of the battery.

With the above construction, similarly to the third feature of the present invention, the sealed battery can be made thinner, and it exhibits better performance of preventing leakage of the electrolyte. The reliability of the explosion-proof safety features for cutting electricity supply when internal pressure builds up excessively can be improved, and, the construction can be simplified since the resin sheet in the third feature of the present invention is omitted.

The present invention according to a fifth feature thereof provides a closure assembly for sealed batteries characterized by having an insulating resin sheet and a thin metal sheet stacked on the insulating resin sheet, the thin metal sheet being provided with a rupture portion, wherein the insulating resin sheet has a pressure receiving portion defined in one part of the insulating resin sheet, and the insulating resin sheet and thin metal sheet stacked thereon are restricted at a position surrounding the pressure receiving portion by other elements constituting the closure assembly that are positioned above and below the insulating resin sheet and thin metal sheet, said rupture portion of the thin metal sheet being positioned above said pressure receiving portion, and an external electrode terminal of the battery is electrically connected to an internal electrode of the battery through the rupture portion of the thin metal sheet, so that, when pressure within the battery increases excessively and reaches a first predetermined limit, the pressure receiving portion of the insulating resin sheet expands, whereby the rupture portion of the thin metal sheet ruptures for breaking the electrical connection between the external electrode terminal and internal electrode of the battery, and when the pressure within the battery further increases and reaches a second predetermined limit, the pressure receiving portion bursts for releasing gas within the battery to the outside of the battery.

With the above construction, similarly to the above first and third features of the present invention, the reliability of the explosion-proof safety features for breaking electricity supply when internal pressure builds up excessively and reaches a first predetermined limit, and the reliability of the explosion-proof safety features for releasing gas when the internal pressure further increases and reaches a second predetermined limit can both be improved. In addition, the sealed battery can be made thinner, and the electrolyte leakage-proof performance can be also improved.

The present invention according to a sixth feature thereof provides a closure assembly for sealed batteries characterized by having an insulating resin gasket shaped in a dish-like form having a bottom and provided with a thin part in the bottom thereof, said thin part being defined to be a pressure receiving portion, and a thin metal sheet having a rupture portion stacked upon the upper surface of the bottom of the insulating resin gasket, wherein the thin metal sheet is restricted at a position surrounding the pressure receiving portion by the insulating resin gasket and other elements constituting the closure assembly that are positioned above the thin metal sheet, said rupture portion of the thin metal sheet being positioned above said pressure receiving portion, and an external electrode terminal of the battery is electrically connected to an internal electrode of the battery through the rupture portion of the thin metal sheet, so that, when pressure within the battery increases excessively and reaches a first predetermined limit, the pressure receiving portion of the insulating resin sheet expands, whereby the rupture portion of the thin metal sheet ruptures for breaking the electrical connection between the external electrode terminal and internal electrode of the battery, and when the pressure within the battery further increases and reaches a second predetermined limit, the pressure receiving portion bursts for releasing gas within the battery to the outside of the battery.

With the above construction, similarly to the above fifth feature of the present invention, the reliability of the explosion-proof safety features for breaking electricity supply when internal pressure builds up excessively and reaches a first predetermined limit, and the reliability of the explosion-proof safety features for releasing gas when the internal pressure further increases and reaches a second predetermined limit can both be improved. In addition, the sealed battery can be made thinner, and the electrolyte leakage-proof performance can be also improved. Moreover, the construction can be simplified since the resin sheet in the fifth feature of the present invention is omitted.

In each of the second, fourth, and sixth features of the present invention, the pressure receiving portion of the insulating resin gasket can be constituted by a thin part uniformly provided to the gasket body. However, it is preferable that the pressure receiving portion is made of a resin film formed separately from the gasket body, this resin film being joined to the bore of the gasket body.

By constituting the pressure receiving portion with a separate resin film, the pressure at which the pressure receiving portion bursts or at which the rupture portion breaks can be more precisely determined with less variation. The reliability of the explosion-proof safety features can be thereby further improved.

Furthermore, by forming the insulating resin gasket by injection molding with a resin film placed at a predetermined position between metal molds, the closure assembly for sealed battery which has highly reliable explosion-proof safety features can be efficiently manufactured.

Moreover, by using a resin which has a high barrier effect against transmission of internal gas for the resin film, the airproof performance can be maintained. Alternatively, if the resin film is composed of the same resin as that of the gasket body and a resin which has a high barrier effect against transmission of internal gas, these being laminated, not only the airproof performance can be maintained, but also the bonding performance between the resin film and gasket body can be improved.

BRIEF DESCRIPTION OF THE DRAWINGS

FIG. 7 is a cross-sectional view showing a manufacturing process of the insulating resin gasket;

FIG. 8A is a plan view and FIG. 8B is a longitudinal sectional view showing the insulating resin gasket;

FIG. 9A is a cross-sectional view and FIG. 9B is a plan view showing one modification of insulating resin gasket in the first embodiment;

DETAILED DESCRIPTION OF THE INVENTION

Preferred embodiments of the present invention will be hereinafter described with reference to the accompanying drawings.

FIGS. 1 through 8 show a first embodiment of the present invention.

Figure 1:
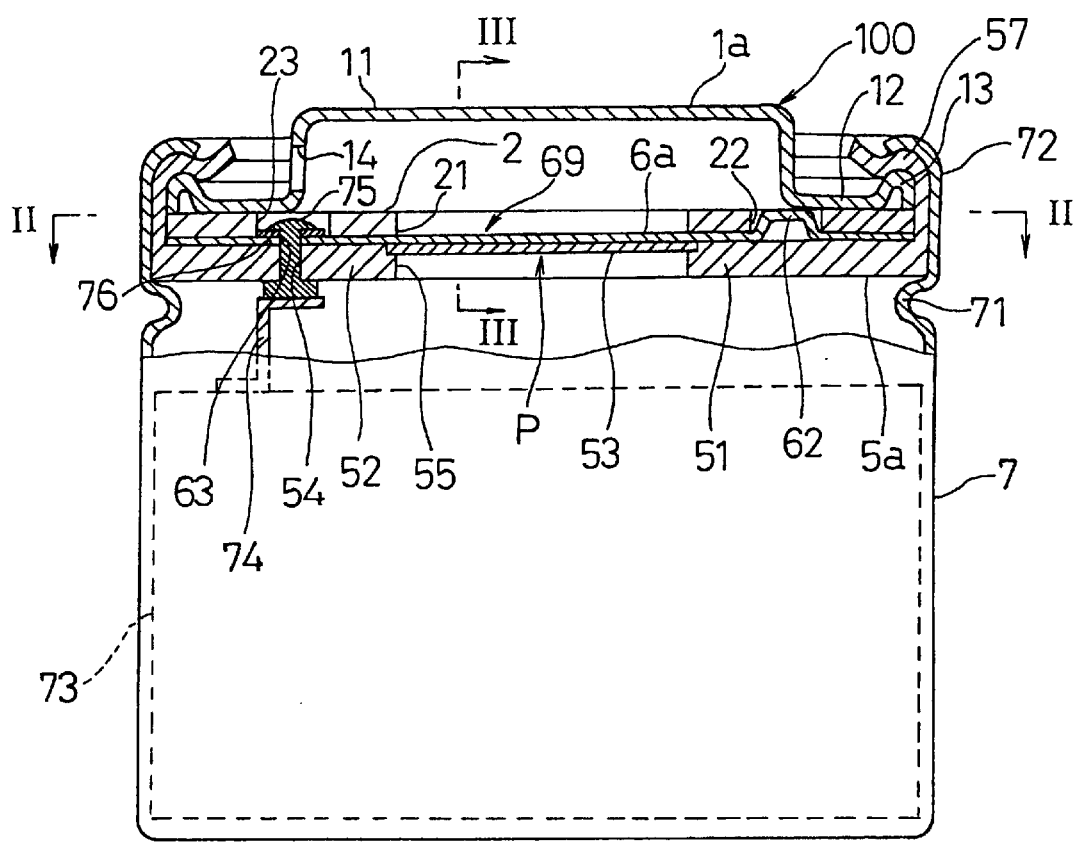
FIG. 1 is a longitudinal sectional view of a sealed battery in a first embodiment of the present invention.
Figure 2:
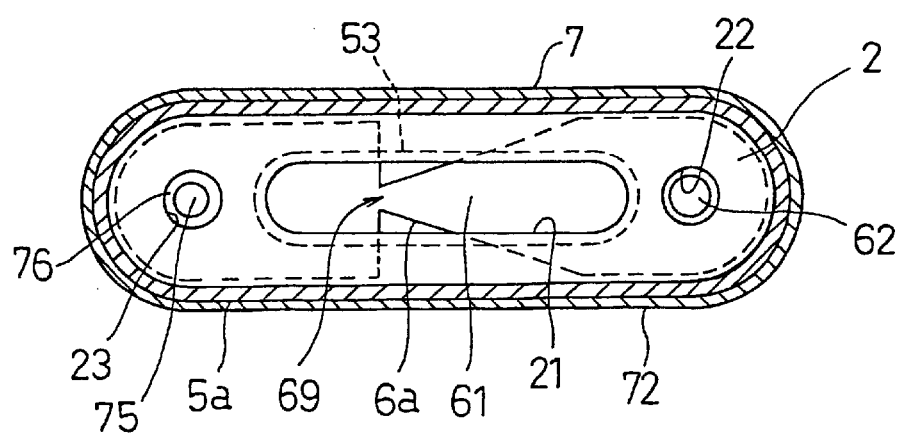
FIG. 2 is a cross-sectional view taken on line II-II of FIG. 1.

This embodiment of the closure assembly according to the present invention is applied to a lithium ion secondary battery generally elliptic in cross-section. Referring to FIG. 1 and FIG. 2, elliptic metal cap serves as the external electrode terminal of the cathode and comprises a raised central portion 11, and a ring-like flat flange 12 surrounding the raised portion 11. Flange 12 has a rib portion 13 on its edge that is bent so as to be readily crimped. 14 is a vent for releasing gas.

Reference numeral 2 represents a resin guide plate (insulating guide plate) made of a flat plate having rigidity, the outline of which conforms substantially to that of the metal cap 1a. Resin guide plate 2 is formed with an air hole 21 in its center elongated in left and right directions, a circular punched hole 22 to the right of the air hole 21 for electrical connection, and a circular through hole 23 to the left of the air hole 21 for passing a contact terminal. Resin guide plate 2 should preferably be, but not limited, made of polypropylene (PP) or fluorocarbon resin.

Reference numeral 6a represents a thin metal sheet which is made of an aluminum foil having a thickness of from 0.04 to 0.10 mm and has a narrow part 69 that has a smaller width than other parts at a position somewhat to the left of the center. As shown in FIG. 2, the left and right ends of the thin metal sheet 6a are formed of a configuration substantially same as that of the ends of the resin guide plate 2. In the middle, however, the thin metal sheet 6a has a tapered portion 61 where the width decreases gradually to the left side, and the narrowest portion at the end of the tapered portion 61 is the aforementioned narrow part 69, or as it will be hereinafter referred to, a rupture portion. The thin metal sheet 6a is further formed with a projection 62 in its right part that contacts the flange 12 of the metal cap 1a, and a through hole 63 (FIG. 1) for passing the contact terminal 75 in its left part.

Reference numeral 5a represents a dish-like insulating resin gasket formed with a thin part 53 in the center of its bottom 52 having a thickness of from 0.05 to 0.15 mm at a position conforming to that of the air hole 21 in an area somewhat larger than the air hole 21, and a through hole 54 for passing the contact terminal 75 to the left of this thin part 53. The upper face of the thin part 53 is coplanar with that of other parts of the bottom 52. The thin part 53 may be uniformly formed of the same material as that of the gasket body 51, but should preferably be formed of a separate resin film, this being joined onto the bore 55 of the gasket body 51. The bore 55 is formed such as to be commensurate in position and shape with the above mentioned air hole 21. Such resin film or thin part 53 may be joined to the gasket body 51 by heat welding or by the use of an adhesive, but more preferably, it may be provided simultaneously upon injection molding of the gasket body 51 when fabricating the insulating resin gasket 5a by molding with upper and lower metal molds 101, 102 as shown in FIG. 7 and FIG. 8, by placing a rectangular strip of resin film (thin part) 53 at a predetermined position between the upper and lower molds.

In this embodiment, the insulating resin gasket 5a is formed by the molding method shown in FIG. 7 and FIG. 8. Gasket body 51 is made of PP while the resin film 53 is made of a material which can provide a high barrier effect against transmission of internal gas. Specifically, the resin film 53 shown in FIG. 6 consists of a film 53a of polyvinyl alcohol (PVA) and resin films 53b, 53c of PP, that is the same material as that of the gasket body 51, these 5 resin films 53b, 53c being laminated on both sides of the PVA film 53a. Such laminated film exhibits a high barrier effect thanks to the PVA film 53a, while the PP films 53b, 53c exhibit high bonding performance as well as moisture resistance, making up for the disadvantage of PVA film 53a.

Figure 3:
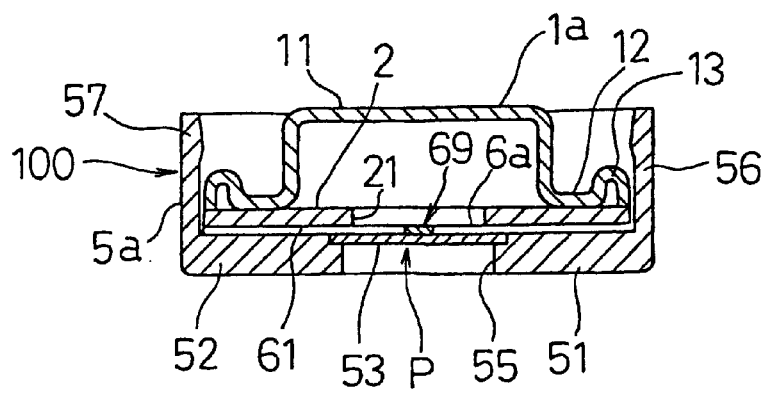
FIG. 3 is a cross-sectional view of a closure assembly before being assembled to the battery taken in the direction of arrows on line III-III of FIG. 1.

The insulating resin gasket 5a is configured as shown in FIG. 3 before being crimped. Thin metal sheet 6a, insulating guide plate 2, and metal cap 1a are inserted in order into the inside space surrounded by a standing wall 56, and, as shown in FIG. 1, thin metal sheet 6a is riveted to gasket body 51 of insulating resin gasket 5a with contact terminal 75. In FIG. 1, 76 is a washer interposed between the head of contact terminal 75 and thin metal sheet 6a.

The closure assembly 100 constructed as described above is fitted into the space of an upper end of outer case 7 that serves as the external electrode terminal of anode to be supported from below by a support projection 71 formed by providing a recess from outside in the outer case 7, and thereafter, the upper edge 72 of outer case 7 is inwardly crimped thereby bending the upper edge 57 of insulating resin gasket 5a inwardly, thus fixing closure assembly 100 to outer case 7. The above mentioned contact terminal 75 is connected to a lead 74 that extends upwardly from electricity generating elements accommodated within outer case 7. Further, the electrical connection between metal cap 1a and thin metal sheet 6a is achieved through the projection 62 that protrudes through the punched hole 22 formed in resin guide plate 2. Projection 62 may be provided to the metal cap side instead of on the thin metal sheet 6a.

Thus the closure assembly in this embodiment comprises the insulating resin gasket 5a in the shape of a dish with bottom 52 having thin part 53, in which the thin metal sheet 6a having narrow part 69, insulating guide plate 2 having air hole 21 that is commensurate in position with said thin part 53 of the insulating resin gasket 5a, and metal cap 1a that serves as the external electrode terminal of cathode (or anode depending on the type of battery), are laid on one another. Thin metal sheet 6a is connected to metal cap 1a through punched hole 22 in insulating guide plate 2 and is fixed to insulating resin gasket 5a by contact terminal 75 which is connected to electrode (lead) 74 in the battery. A portion of the thin part 53 in the bottom 52 surrounded by the bore 55 of insulating resin gasket 5a is defined to be a pressure receiving portion P, and the thin metal sheet 6a is restricted by insulating resin gasket 5a and insulating guide plate 2 at positions such as to surround this pressure receiving portion P. Thin metal sheet 6a is arranged such that the narrow part (rupture portion) 69 is positioned above the pressure receiving portion P.

Figure 4:
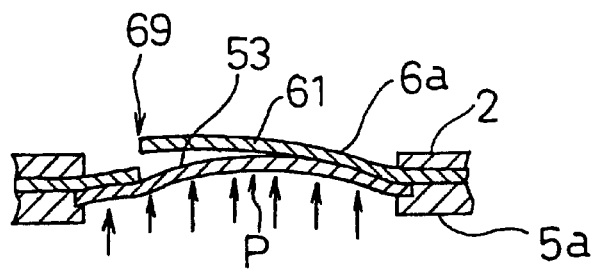
FIG. 4 is a schematic cross-sectional view showing how pressure acts on the rupture portion and pressure receiving portion.

When the pressure within the battery builds up abnormally and reaches a first predetermined limit, the pressure receiving portion P expands and thereby causes the narrow part (rupture portion 69) of thin metal sheet 6a to break as shown in FIG. 4, thus cutting electrical connection between the external terminal (metal cap) 1a and inner electrode (lead) 74 of the battery. In other words, upon an abnormal increase in gas pressure within the battery, the gas pressure acts on the thin part 53 through the bore 55 of insulating resin gasket 5a, pushing the pressure receiving portion P of thin part 53 upwards. Since the periphery of thin part 53 is restricted from above by the insulating guide plate 2 along the outline of the air hole 21, the thin part 53 expands in its central portion in the air hole 21 and deforms upwards in a dome-like form. When the gas pressure reaches a first predetermined value, the weakest point in strength of thin metal sheet 6a, i.e., the narrow part (rupture portion) 69 breaks and the tapered portion 61 is pushed up, thereby cutting the electrical connection between the left and right parts of thin metal sheet 6a. Electrical connection between the inner electrode (lead) 74 of the battery and metal cap 1a is thus broken, and accordingly, if this happens during a charging operation, charging is interrupted whereby further increases in temperature or pressure within the battery is prevented.

Figure 5:
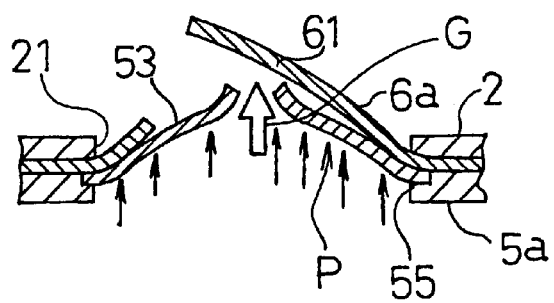
FIG. 5 is a schematic cross-sectional view showing how pressure acts on the rupture portion and pressure receiving portion.
Figure 6:
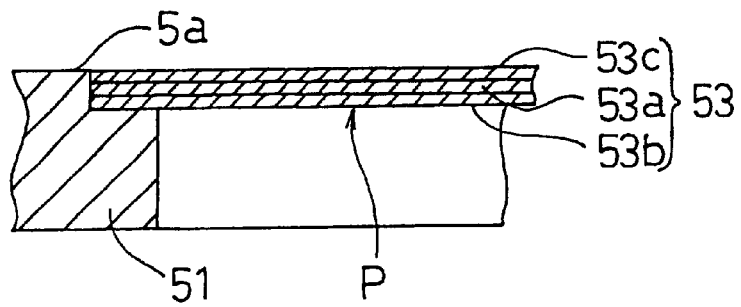
FIG. 6 is a cross-sectional view showing major parts of an insulating resin gasket.

Successively, when the internal pressure of the battery further increases and reaches a second predetermined value, the above mentioned pressure receiving portion P expands and eventually bursts so as to release the gas G within the battery to the outside, as shown in FIG. 5. In other words, the thin part 53 bursts when the internal pressure reaches a second predetermined value higher than the first predetermined value where expansion of thin part 53 exceeds a certain limit, whereby the gas G is released through the bore 55, the burst in thin part 53, air hole 21 and gas vent 14 in metal cap 1*a* to the outside. Explosion of the battery is thus prevented.

Next, various modifications of this embodiment will be described.

While a strip of rectangular resin film is used for providing the thin part 53 in the above first embodiment, a continuous band (hoop) of resin film 53*d* may be fed to between the upper and lower metal molds 101, 102 as shown in FIG. 9, so that the resin film 53*d* is joined to the gasket body 51 when molding the insulating resin gasket 5*m*. Before or after the molding, the resin film 53*d* may be cut to the same width as that of the insulating resin gasket 5*m*. Production efficiency is thereby enhanced.

Also, while the resin film 53 in the above first embodiment has a three layer structure, it may be composed of two layers, the upper layer being of resin having a high barrier effect against internal gas and the lower layer being of the same resin as that of the gasket body. For the film that exhibits a high barrier effect of preventing transmission of internal gas, a single film consisting of any of polyethylene terephthalate, polychlorinated vinylidene, tetrafluoroethylene perfluoroalkyl vinylether copolymer, or nylon, or a multi-layer film comprising any of the aforementioned resin and a PP resin may be used.

Furthermore, while the closure assembly in the above first embodiment is constructed such that the rupture portion 69 of the thin metal sheet 6*a* breaks when the internal pressure reaches a first predetermined limit and the pressure receiving portion P expands and bursts when the internal pressure reaches a second predetermined limit, it may be constructed such that when the internal pressure reaches the first predetermined limit, the rupture portion 69 of the thin metal sheet 6*a* breaks such as to stop power supply.

Figure 10:
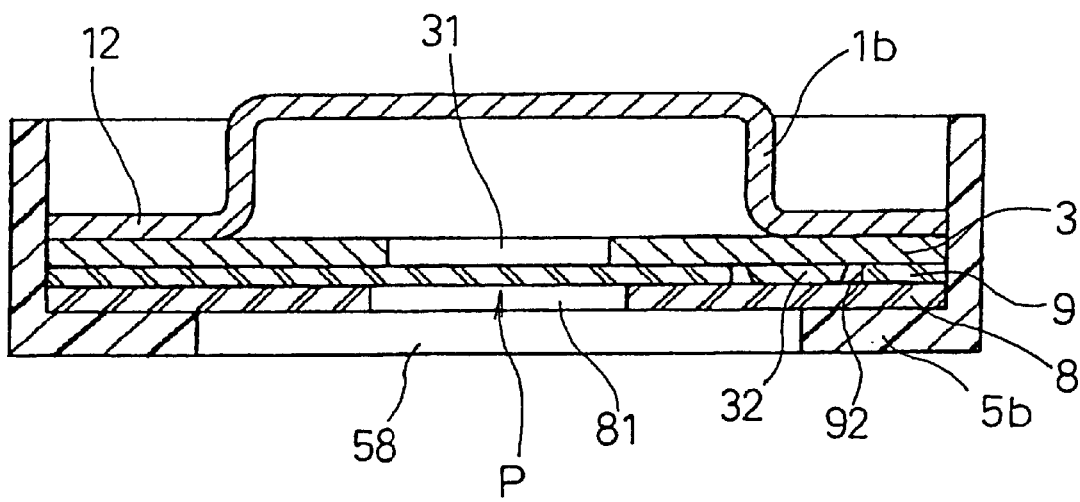
FIG. 10 is a longitudinal sectional view of a closure assembly for sealed battery in a second embodiment of the present invention.
Figure 19:
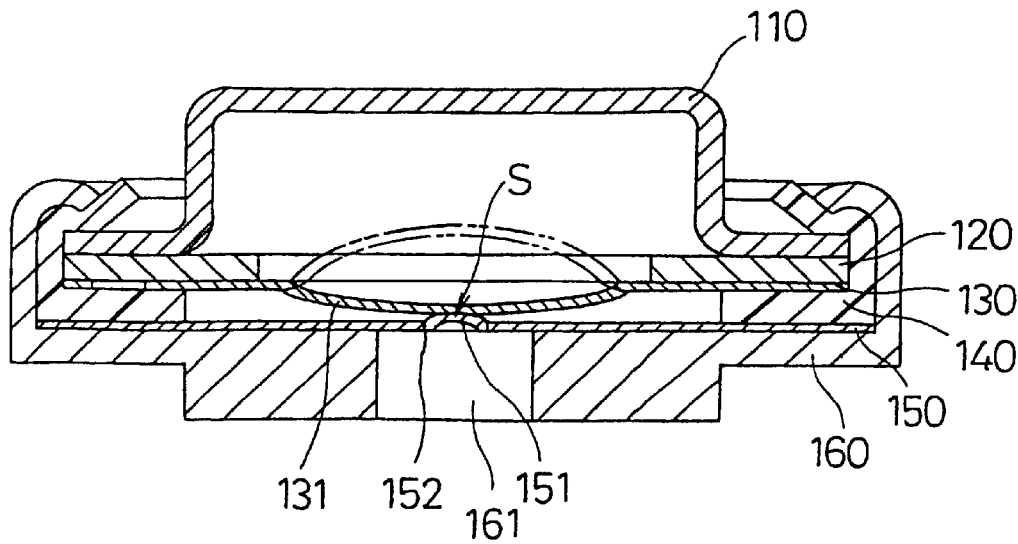
FIG. 19 is a cross-sectional view of a prior art closure assembly for sealed battery.
Figure 20:
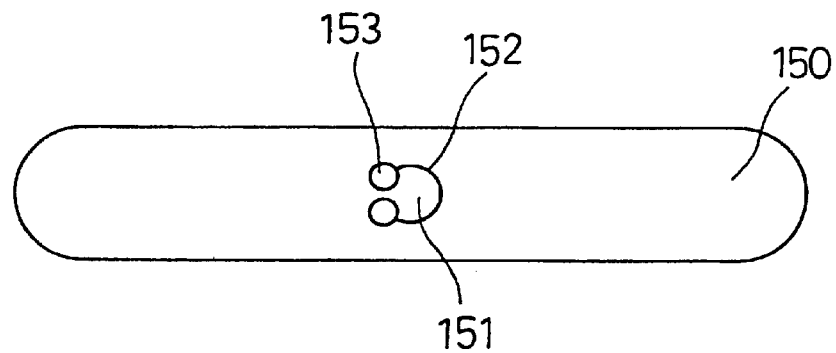
FIG. 20 is a plan view of a lower metal foil in the prior art.
Figure 21A:
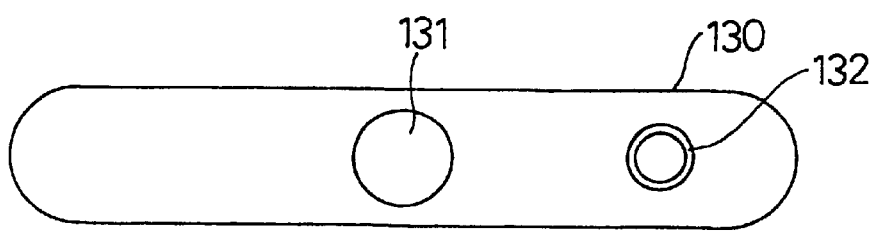
FIG. 21 is a plan view of an upper metal foil in the prior art.

The second embodiment of the closure assembly for sealed batteries is shown in FIG. 10 and comprises a metal plate 8 having a hole 81, an insulating resin sheet 9, a metal guide plate 3 having a hole 31, and a metal cap 1*a* serving as an external terminal of cathode, layered on one another within the insulating gasket 5*b*. A projection 32 provided to the metal guide plate 3 such as to protrude downwardly contacts the metal plate 8 through a punched hole 92 provided in the insulating resin sheet 9, whereby electrical connection between the metal guide plate 3 and metal plate 8 is achieved. Upon an abnormal increase in pressure within the battery, the pressure receiving portion P of the insulating resin sheet 9 defined by the holes 81 and 31 of the metal plate 8 and metal guide plate 3 bursts for releasing the internal gas to the outside. With such construction, there is no variation in breaking pressure caused by variation in machining precision of the upper metal foil as in the prior art example shown in FIG. 19 to FIG. 21, or, there is no risk that cracks are created in the upper metal foil 130. The reliability of explosion-proof safety mechanism of the closure assembly can be thus improved.

The metal cap 1*b* serves as the external terminal of cathode (or anode depending on cases) and has a ring-form flange 12. Metal guide plate 3 has its hole 31 in the center and is assembled below the metal cap 1*b*. Insulating resin sheet 9 is made of PP or fluorocarbon resin having a thickness of from 0.05 to 0.15 mm. The insulating resin sheet 9, upon a build-up of pressure within the battery, expands upwards by the gas pressure that acts thereon through the hole 81 in the center of the metal plate 8, but since its periphery is restricted by the metal guide plate 3, only the central portion bursts thereby releasing the gas within the battery. The insulating gasket 5*b* is an annular member substantially in the form of letter L in cross section, having a large hole 58 in its center. The outer edge of the insulating gasket 5*b* is inwardly crimped by the upper open end of the outer case similarly to the case shown in FIG. 1, so as to wrap each outer edge of the metal cap 1*b*, metal guide plate 3, insulating resin sheet 9, and metal plate 8, and to fix them to the outer case.

In the above construction, the periphery of the insulating resin sheet 9 may be directly pressed down by the ring-like flange 12 of the metal cap 1*b* so as to dispense with the metal guide plate 3 thereby to reduce the overall cost.

The insulating resin sheet 9 may be bonded to the metal plate 8 prior to assemblage so that they can be uniformly assembled, whereby not only the assembling process is simplified, but also leakage-proof characteristics can be improved.

For the insulating resin sheet 9, the resin film 53 used in the first embodiment that provides a high barrier effect of preventing transmission of internal gas may be employed. Other advantageous structures of the first embodiment may also be applied to this or other embodiments described later. It is to be noted that instead of using the insulating resin sheet 9 as in this embodiment, a metal foil may be used for the internal gas pressure receiving sheet.

Figure 11:
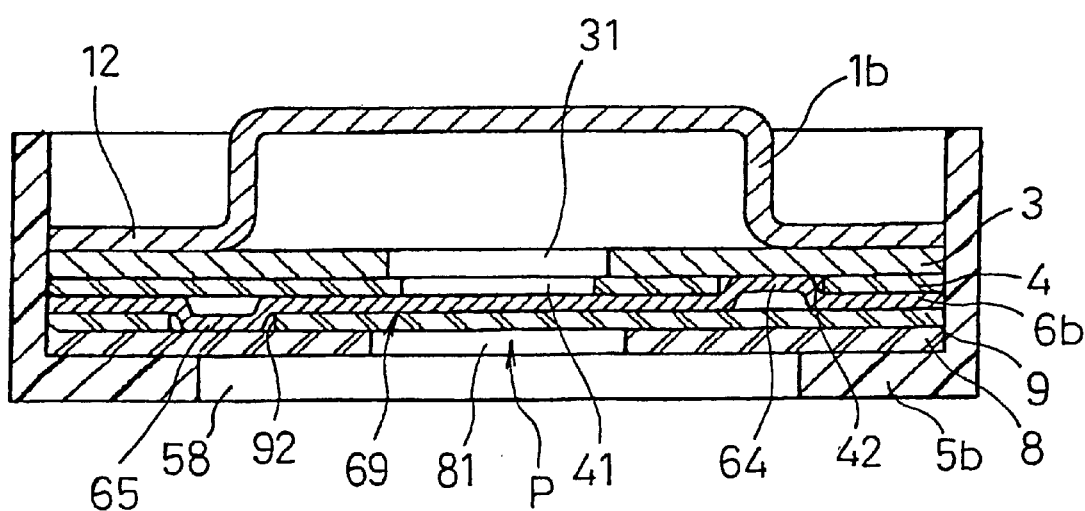
FIG. 11 is a longitudinal sectional view of a closure assembly for sealed battery in a third embodiment of the present invention.
Figure 12:
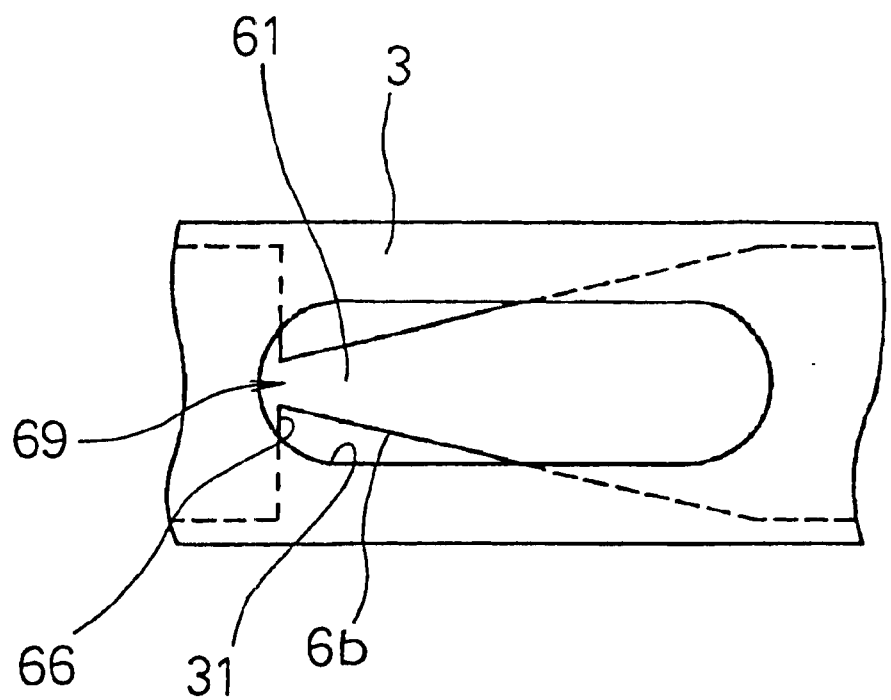
FIG. 12 is a plan view of the parts concerned showing the positional relationship between a metal guide plate and thin metal sheet in the closure assembly for sealed battery in the third embodiment of the present invention.
Figure 13:
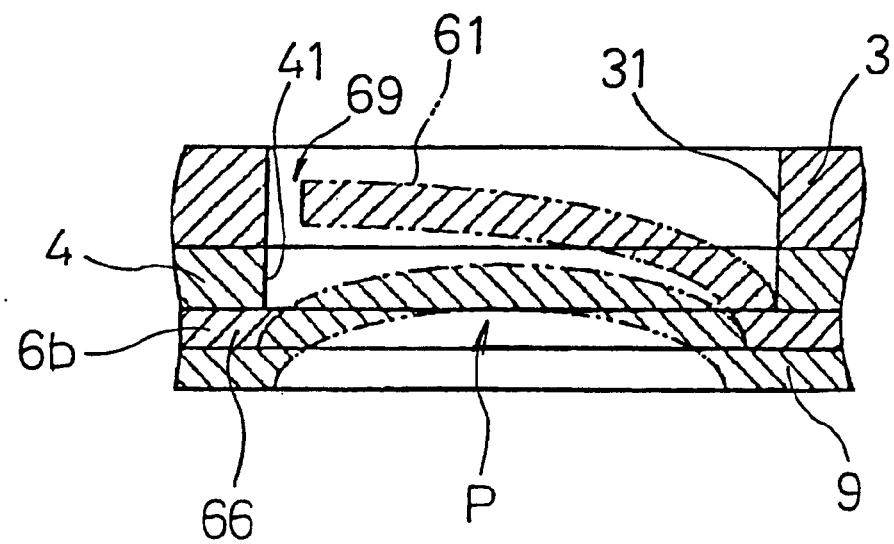
FIG. 13 is a cross-sectional view of same.

The third embodiment of the closure assembly for sealed batteries is shown in FIG. 11 to FIG. 13 and comprises a metal plate 8 having a hole 81, an insulating resin sheet 9, a thin metal sheet 6*b* consisting of a metal foil sheet having a narrow part 69, an insulating sheet 4 having an air hole 41, a metal guide plate 3 having a hole 31, and a metal cap 1*b* serving as an external terminal of cathode, layered on one another within the insulating gasket 5*b* having a hole 58. The electrical connection between the metal guide plate 3 and metal plate 8 is achieved by the thin metal sheet 6*b* through respective punched holes 92, 42 of the insulating resin sheet 9 and insulating sheet 4. Upon an abnormal increase in pressure within the battery, the narrow part (rupture portion) 69 of the thin metal sheet 6*b* provided in a position correspondingly to the respective holes 81, 41, and 31 of the metal plate 8, insulating sheet 4, and metal guide plate 3 bursts for breaking the electrical connection between the metal plate 8 and metal guide plate 3. With such construction, there is no risk that cracks are created in the upper metal foil 130 and lower metal foil 150 in the prior art example shown in FIG. 19 to FIG. 21 caused by laser welding, and the reliability of the closure assembly can be thus improved. Also, since there is no need to provide a space for allowing the warped portion 131 of the upper metal foil 130 to be inverted, the effective internal volume of the battery can be increased and thereby the battery capacity can be improved.

Like elements shown in FIG. 10 are given the same reference numerals and detailed descriptions thereof will be omitted. The band-like thin metal sheet 6*b* has projections 64, 65 protruding in opposite directions and is interposed between the insulating sheet 4 and insulating resin sheet 9. The projections 64, 65 respectively fit in the punched holes 42, 92 of the insulating sheet 4 and insulating resin sheet 9, so that the upward projection 64 contacts the metal guide plate 3 and downward projection 65 contacts the metal plate 8, whereby electrical connection between the metal plate 8 that contacts an electrode within the battery and metal cap 1*b* is achieved through the thin metal sheet 6*b* and metal guide plate 3. Thin metal sheet 6*b* is constructed similarly to the thin metal sheet 6*a* of the first embodiment (see FIG. 2) and has a tapered portion 61 and the narrow part 69 or rupture portion as shown in FIG. 12. Unlike the thin metal sheet 6a of the first embodiment, however, the thin metal sheet 6b of this embodiment is configured such that the narrow part 69 is positioned nearer to one end of the hole 31 of the metal guide plate 3.

The narrow part 69 connects with an extended portion 66 on the left side which spreads at right angles toward both sides in relation to the center line of the thin metal sheet 6b as shown in FIG. 12. When the gas pressure within the battery builds up excessively, the gas passes through the holes 58 and 81, pressing up the center (pressure receiving portion P) of the insulating resin sheet 9, whereupon the weakest point of the thin metal sheet 6b, i.e., the narrow part 69 is cut and the tapered portion 61 is thrust upwards, as shown in FIG. 13. At this time, the extended portion 66 is restricted by the metal guide plate 3 not to be lifted upwards, and therefore only the tapered portion 61 projects toward inside of the hole 31 of the metal guide plate 3 through the air hole 41 of the insulating sheet 4. And even after the pressure within the battery has decreased, the distal end of the tapered portion 61 does not contact the extended portion 66, whereby the broken state is maintained. The thin metal sheet 6b is cut at the narrow part 69 and this state is maintained as described above, the metal cap 1b is disconnected from the internal electrode of the battery. The safety features operate as described above and completely break the electric current path by cutting the metal thin sheet 6b. In this embodiment, since the narrow part 69 is positioned nearer to one end of the hole 31 of the metal guide plate 3, when the thin metal sheet 6b is broken, the distal end of the tapered portion 61 can be brought well apart from the extended portion 66 as shown in FIG. 13 as compared to the first embodiment.

Figure 14:
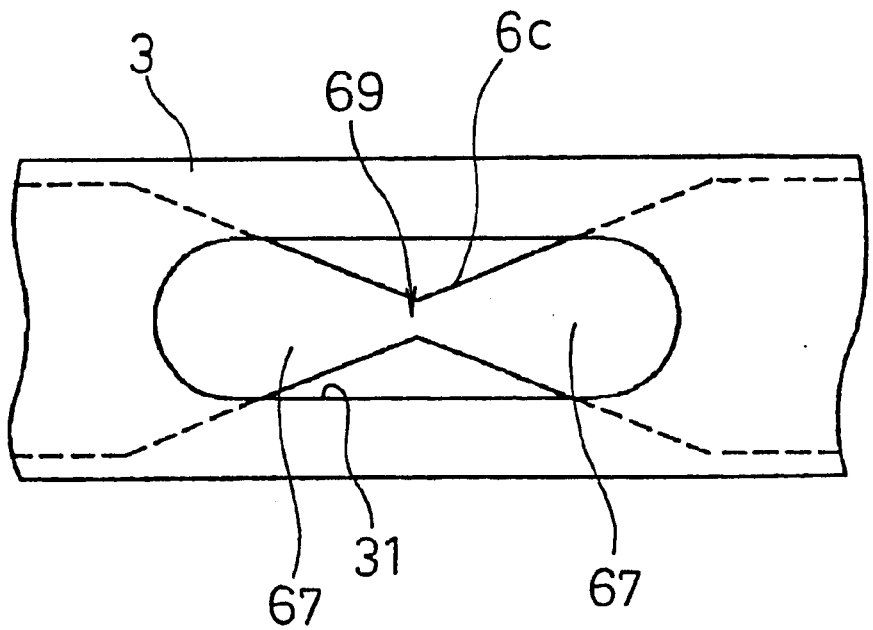
FIG. 14 is a plan view of the parts concerned showing the positional relationship between a metal guide plate and thin metal sheet in one modification of the closure assembly for sealed battery in the third embodiment of the present invention.
Figure 15:
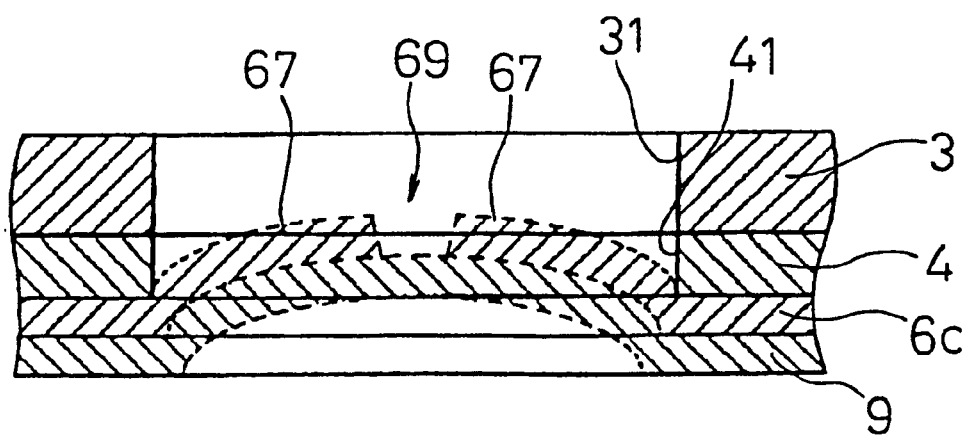
FIG. 15 is a cross-sectional view of same.

It is possible to construct the thin metal sheet 6c such as to have tapered portions 67, 67 on both sides with the narrow part 69 being positioned in the center, as shown in FIG. 14. However, in such arrangement, when the thin metal sheet 6c is broken, both tapered portions 67, 67 are thrust upwards in symmetry as shown in FIG. 15, and therefore it can happen that, when the internal pressure of the battery decreases after gas has been released, the distal ends of the tapered portions 67, 67 contact with each other by a shock. The arrangement shown in FIG. 12 is thus better as safety features.

Figure 16:
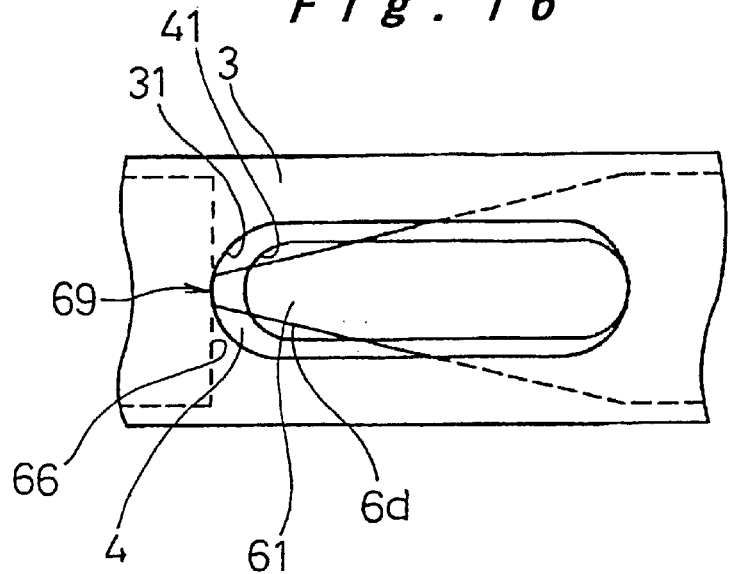
FIG. 16 is a plan view of the parts concerned showing the positional relationship between a metal guide plate, insulating sheet, and thin metal sheet in yet another modification of the closure assembly for sealed battery in the third embodiment of the present invention.
Figure 17:
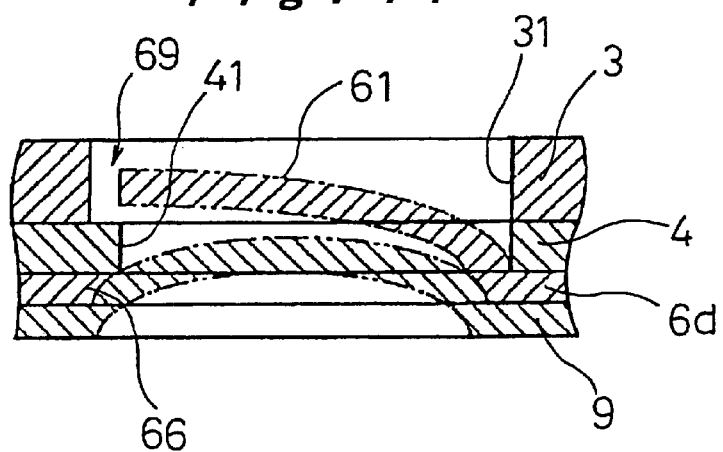
FIG. 17 is a cross-sectional view of same.

FIG. 16 shows one modification of the third embodiment. In this modified example, the dimensions of the air hole 41 of the insulating sheet are set smaller than the dimensions of the hole 31 of the metal guide plate 3, and the metal guide plate 3 and insulating sheet 4 are arranged such that one end of the air hole 41 of the insulating sheet 4 is positioned nearer to the central side than the end of the hole 31 of the metal guide 3 where the narrow part 69 of the thin metal sheet 6d is positioned. By such arrangement, when the narrow part 69 of the thin metal sheet 6d is broken upon an abnormal increase in pressure within the battery and the tapered portion 61 projects above the air hole 41 of the insulating sheet 4, the insulating sheet 4 blocks the distal end of the tapered portion 61 as shown in FIG. 17 and thereby prevents it from returning to the initial position even after the decrease of pressure. Therefore, the tapered portion 61 is certainly prevented from contacting the extended portion 66 of the thin metal sheet 6d again by vibration or shock even after the pressure within the battery has decreased.

As another modification of the third embodiment, the closure assembly may be constructed such that the periphery of the insulating sheet 4 is directly pressed downward by the ring-like flange 12 of the metal cap 1b, the flange 12 directly contacting the projection 64 of the thin metal sheet 6b, so as to dispense with the metal guide plate 3.

While the description of the third embodiment has been made with respect to the case where electricity supply is cut by the break of the rupture portion (narrow part) 69 of the thin metal sheet 6b when the pressure within the battery reaches a predetermined limit, the construction of the first embodiment may also be applied, wherein the pressure receiving portion P of the insulating resin sheet 9 bursts for releasing gas when the internal pressure reaches a second predetermined limit. Specifically, upon a further build-up of gas pressure within the battery, the expanded portion of the insulating resin sheet eventually bursts, thereby allowing the internal gas to pass through the burst of the insulating resin sheet 9, the split portion of the thin metal sheet 6b, the hole 41 of the insulating sheet 4, and the hole 31 of the metal guide plate 3, and reaches the inner space of the metal cap 1b, and successively passes through a gap between the flange 12 of the metal cap 1b and insulating gasket 5b (or through a gas vent 14 in case such gas vent 14 is provided in the metal cap 1a as in the first embodiment) and escapes to the outside. Explosion of the battery is thereby avoided.

Figure 18:
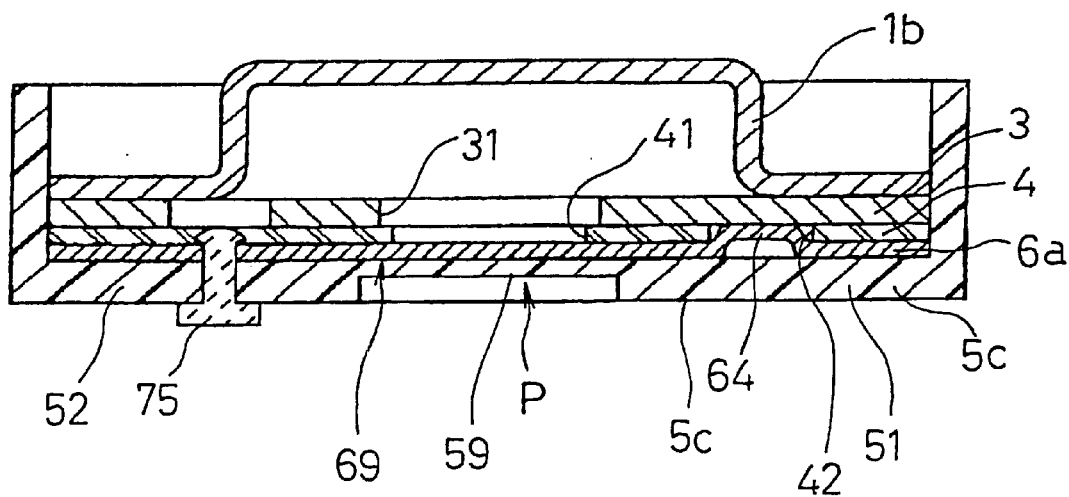
FIG. 18 is a longitudinal sectional view of a closure assembly for sealed battery in a fourth embodiment of the present invention.

The fourth embodiment of the closure assembly for sealed batteries is shown in FIG. 18 and comprises an insulating gasket 5c shaped in a dish-like form having a thin part 59 in its bottom 52, in which a thin metal sheet 6a having a narrow part (rupture portion) 69, an insulating sheet 4 having an air hole 41, a metal guide plate 3 having a hole 31, and a metal cap 1b serving as an external terminal of the cathode are layered on one another. The thin metal sheet 6a and metal guide plate 3 are electrically connected through a punched hole 42 provided in the insulating sheet 4. The thin metal sheet 6a is fixed to the insulating gasket 5c by a contact terminal 75 that is electrically connected to an internal electrode of the battery.

In this embodiment, the thin part 59 of the insulating gasket 5c is uniformly provided to the gasket body 51. The metal guide plate 3 and insulating sheet 4 are interposed between the metal cap 1b and thin metal sheet 6a. An upward projection 64 provided in the thin metal sheet 6a that is electrically connected to the contact terminal 75 protrudes through the punched hole 42 provided in the insulating sheet 4 and contacts the metal guide 3 that is electrically connected to the metal cap 1b. Other structures are substantially the same as those of the first embodiment and the descriptions thereof will be omitted.

According to the present invention, it is possible to provide a battery equipped with reliable explosion-proof safety features of either or both cutting electric current supply and/or releasing internal gas. The battery also exhibits excellent leakage-proof performance, and furthermore, the battery capacity can be improved by reducing internal volume occupied by the closure assembly.

The present invention also provides a closure assembly for sealed batteries with a simple construction that has a high barrier effect against transmission of internal gas.

What is claimed is:

1. A closure assembly for a sealed battery comprising:
   a first insulating sheet;
   a thin metal sheet, positioned on top of the first insulating sheet, provided with a rupture portion, wherein the first insulating sheet has a pressure receiving portion defined in one part of the first insulating sheet;
   the first insulating sheet and the thin metal sheet being restricted at a position surrounding the pressure receiving portion;

the rupture portion being positioned above said pressure receiving portion; and an external electrode terminal of the battery is electrically connected to an internal electrode of the battery through the rupture portion of the thin metal sheet, so that, upon an abnormal increase in pressure within the battery, the pressure receiving portion of the first insulating sheet expands, whereby the rupture portion of the thin metal sheet ruptures, so as to break the electrical connection between the external electrode terminal and the internal electrode of the battery.

2. A closure assembly for a sealed battery according to claim 1 further comprising:

an insulating gasket shaped in a dish shape having a bottom provided with a thin part, said thin part being defined to be a second pressure receiving portion;

a periphery of said second pressure receiving portion of the insulating gasket being restricted by a closure structure positioned above the periphery of the second pressure receiving portion, so that, upon an abnormal increase in pressure within the battery, the second pressure receiving portion of the insulating gasket expands so as to relieve the pressure within the battery.

3. The closure assembly for a sealed battery according to claim 2, wherein the second pressure receiving portion is uniformly provided to a gasket body of the insulating gasket.

4. The closure assembly for a sealed battery according to claim 2, wherein the second pressure receiving portion is formed of a resin film joined to a bore of a gasket body of the insulating gasket.

5. The closure assembly for a sealed battery according to claim 4, wherein the insulating gasket is formed by injection molding using molds with the resin film positioned between the molds.

6. The closure assembly for a sealed battery according to claim 4, wherein the resin film is made of a material which exhibits a high barrier effect against transmission of internal gas of the battery.

7. The closure assembly for a sealed battery according to claim 6, wherein the resin film is composed of a plurality of layers.

8. The closure assembly for a sealed battery according to claim 1, wherein the rupture portion of the thin metal sheet has a smaller width than a remainder of the thin metal sheet.

9. A closure assembly for a sealed battery according to claim 1 further comprising:

an insulating gasket;

a metal plate having a hole;

a second insulating sheet having an air hole positioned in alignment with the hole of the metal plate;

a metal guide plate having a hole that is positioned in alignment with the hole of the metal plate and the air hole of the second insulating sheet;

a metal cap serving as an external electrode terminal;

the metal plate, the first insulating sheet, the thin metal sheet, the second insulating sheet, the metal guide plate, and the metal cap being laid on top of one another within the insulating gasket; and the metal plate and the metal guide plate being electrically connected by the thin metal sheet through punched holes provided in the first insulating sheet and the second insulating sheet, wherein the first insulating sheet has the pressure receiving portion defined in one part of the first insulating sheet conforming in position to the hole of the metal plate, and the first insulating sheet and the thin metal sheet, stacked on the first insulating sheet, are restricted at a position surrounding the pressure receiving portion by the metal plate, the second insulating sheet, and the metal guide plate, and the narrow part of the thin metal sheet is positioned above the pressure receiving portion.

10. A closure assembly for a sealed battery according to claim 1 further comprising:

an insulating gasket shaped as a dish having a bottom with a thin part;

the thin part of the insulating gasket being defined to be a second pressure receiving portion; and said rupture potion of said thin metal sheet stacked upon the upper surface of the bottom of the insulating gasket, wherein the thin metal sheet is restricted at a position surrounding the second pressure receiving portion by the insulating gasket.

11. The closure assembly for a sealed battery according to claim 10, wherein the rupture portion of the thin metal sheet has a smaller width than the rest of the thin metal part.

12. The closure assembly for a sealed battery according to claim 10, wherein the second pressure receiving portion is uniformly provided to a gasket body of the insulating gasket.

13. The closure assembly for a sealed battery according to claim 10, wherein the second pressure receiving portion is formed of a resin film joined to a bore of a gasket body of the insulating gasket.

14. A The closure assembly for a sealed battery according to claim 13, wherein the insulating gasket is formed by injection molding using molds with the resin film positioned between the molds.

15. The closure assembly for a sealed battery according to claim 13, wherein the resin film is made of a material which exhibits a high barrier effect against transmission of internal gas of the battery.

16. The closure assembly for a sealed battery according to claim 15, wherein the resin film is composed of a plurality of layers.

17. A closure assembly for a sealed battery according to claim 1 further comprising:

an insulating gasket shaped in a dish shape having a bottom with a thin part, the thin part being defined to be a second pressure receiving portion; and the thin metal sheet stacked upon an upper surface of the bottom of the insulating gasket, wherein the thin metal sheet is restricted at a position surrounding the second pressure receiving portion by the insulating gasket; and when the pressure within the battery further increases and reaches a second predetermined limit, the second pressure receiving portion bursts, relieving gas out of the battery.

18. The closure assembly for a sealed battery according to claim 9, wherein the thin metal sheet comprises a tapered portion with a gradually decreasing width, the tapered portion having the narrow part where the width is smallest, wherein the narrow part is connected with an extended portion where the width has an abrupt increase.

* * * * *